Jan. 31, 1956   N. M. BAKER   2,732,696
DISH
Filed Jan. 9, 1953
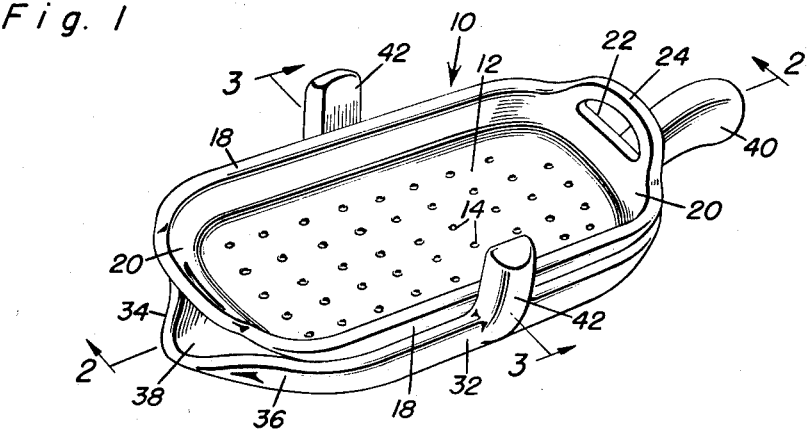
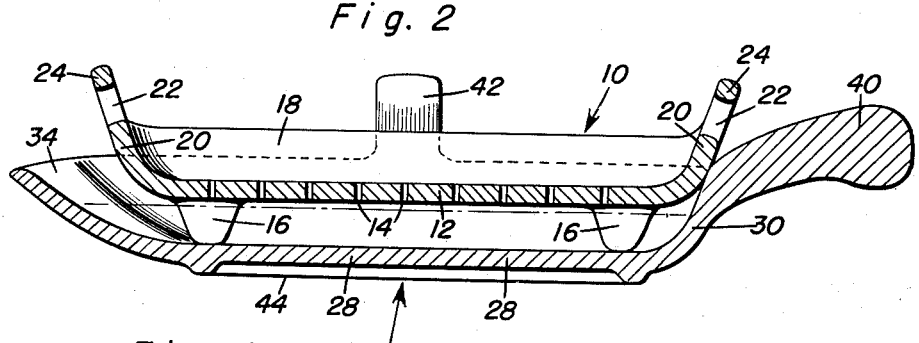
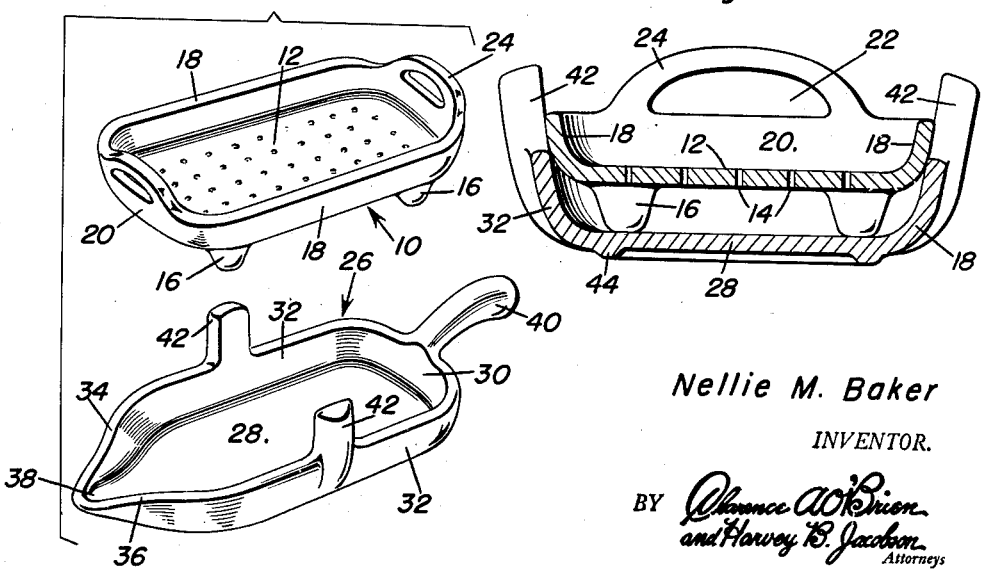
Nellie M. Baker
INVENTOR.

United States Patent Office 2,732,696
Patented Jan. 31, 1956

2,732,696
DISH

Nellie M. Baker, Boston, Ga.

Application January 9, 1953, Serial No. 330,437

1 Claim. (Cl. 65—15)

This invention relates to dishes and more particularly to a dish for draining gravy and juices from articles of food.

An object of this invention is to provide a drain dish assemblage designed to allow juices and the like to drain from articles of food disposed therein.

Another object is to provide a pair of dishes, one disposed within the other, wherein the inner dish is apertured to allow drainage of articles of food disposed therein.

Another object is to provide a receptacle having guide members abutting a drainage dish nested therein.

Still another object is to provide a drainage dish nested within a receptacle wherein the receptacle is provided with a handle and a spout or trough for pouring liquids therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the dish assembly showing the same in nested relation;

Figure 2 is a vertical section taken substantially along the line 2—2 of Figure 1;

Figure 3 is a transverse vertical section taken along line 3—3 of Figure 1; and

Figure 4 is an exploded view showing the drainage dish and receptacle in un-nested relation.

Referring now more particularly to the drawings, Figure 10 indicates generally a drain dish having a bottom 12 provided with a plurality of apertures 14 extending therethrough. Depending from the four corners of the bottom are feet or legs 16 and extending upwardly from opposite sides of the bottom are retaining flanges 18. Side flanges 18 merge and interconnect with opposite end flanges 20 to define a continuous retaining flange assembly extending marginally around the bottom 12. Also, the end flanges are provided with apertures 22 with bails 24 by which the drain dish may be conveniently handled or transported.

From the foregoing, it will be apparent that the assemblage described may be used as a dish within which any desired article or articles of food may be disposed and that liquids flowing from the latter will be drained away through the apertured bottom portion thereof. It will be clear that such a dish will allow the liquid portion of normally wet or soggy food to drain therefrom to maintain such food in a crisp or desirable condition of dampness prior to their serving.

In order to contain the liquid draining from the above described dish, a receptacle, indicated generally at 26, is provided within which dish 10 is disposed in nested relation. The receptacle includes a bottom portion 28 and a continuous marginal wall comprising a rear portion 30, spaced opposed side walls 32 and a pair of outwardly converging front wall portions 34, 36. As will be clear from Figure 4, the converging front wall portions define a pouring spout or trough 38 from which liquids contained within the receptacle may be easily and conveniently poured. To aid in such pouring operations, the rear wall portion 30 is provided with an outwardly extending handle 40 by which the receptacle is conveniently grasped so that it may be readily picked up and transported. This handle also, being remote from the remainder of the receptacle, will normally be cooler than the base portion thereof to prevent the user from being burned when the receptacle is hot.

Obviously, the drain dish 10 will be disposed within receptacle 26, as clearly shown in Figures 1–3, and legs 16 will space bottom 12 of dish 10 vertically above the bottom 28 of receptacle 26. In this manner, a considerable amount of liquids, for example gravy, may be retained in the receptacle while at the same time, preventing articles of food disposed within dish 10 from coming into contact with such gravy. By way of example, a gravy line, which might exist under certain circumstances, is indicated in Figure 2 and it will be noted that such gravy would be completely out of contact with any food disposed within dish 10.

To aid in maintaining dish 10 properly positioned within receptacle 26, the latter is provided, at opposite walls thereof, with a pair of opposing guide members 42 which, as will be apparent from Figure 3, abut adjacent side flanges 18 of dish 10 to obviate lateral shifting or movement of the latter within the receptacle. This construction greatly aids in maintaining the dish 10 properly positioned within receptacle 26 during transportation and manipulation of the assembly when such manipulation is desirable.

On the bottom 28 of receptacle 26 is a continuous ridge 44, the same serving to space bottom 28 away from a supporting surface upon which the receptacle may be placed. This construction, of course, greatly aids in preventing rapid heat transfer from the receptacle to its supporting surface and also tends to insulate the supporting surface from the hot receptacle so that the former will not be marred or damaged by excessive heating.

It will be apparent that when it is desired to drain meats, salads or the like, the drain dish is to be placed within the receptacle and the food, in turn, disposed in the drain dish thereby allowing any excess liquids in the food to drain through the apertures in dish 10 and collect within the receptacle. Thus, the food will be maintained at the desired liquid-free condition and present a palatable dish, the liquor, gravy or the like being retained for subsequent use within the receptacle if so desired. Preferably, pouring operations are performed by grasping the handle 40 in the hand and extending the index finger over one of the bails 24 to thus prevent longitudinal shifting or movement of the dish 10 within the receptacle, lateral shifting being prevented by the guide members 42. In this manner, the dish assembly may be tilted to pour liquids therefrom without danger of the drain dish being disengaged from the receptacle.

From the foregoing, the construction and operation of the device will be readily understood and further explanation is believed to be unnecessary. However, since numerous modifications and changes wil readily occur to those skilled in the art, it is not desired to limit the invention to the exact construction shown and described, and accordingly, all suitable modifications and equivalents may be resorted to, falling within the scope of the appended claim.

What is claimed as new is as follows:

A dish assembly comprising a first dish having a continuous marginal wall rising upwardly from a central portion, said marginal wall including spaced side portions, a front end portion and a rear end portion, a spout formed in said front end portion, an elongated handle extending rearwardly from said rear end portion, a drain dish disposed within said first dish having an apertured bottom, a plurality of legs depending from said drain dish whereby said bottom is spaced above said central portion, said drain dish also having spaced side flanges and end flanges forming a retaining rim, and an upstanding guide member on each of said side portions of the first dish engaging a corresponding side flange of the drain dish.

References Cited in the file of this patent

UNITED STATES PATENTS

| | | | |
|---|---|---|---|
| D. 7,169 | Atterbury | Feb. 17, 1874 |
| D. 105,369 | Swordling | July 20, 1937 |
| D. 106,437 | Guild | Oct. 12, 1937 |
| 180,766 | Housum | Aug. 8, 1876 |
| 604,252 | Lockstone | May 17, 1898 |
| 700,968 | Moore | May 27, 1902 |
| 774,763 | Levey | Nov. 15, 1904 |
| 794,254 | Sanger | July 11, 1905 |
| 828,222 | Leavitt | Aug. 7, 1906 |
| 1,138,570 | Humphries | May 4, 1915 |
| 1,239,834 | Smith | Sept. 11, 1917 |
| 1,650,634 | Lutzler | Nov. 29, 1927 |
| 1,881,873 | Newcomb | Oct. 11, 1932 |
| 2,565,046 | Rooth | Aug. 21, 1951 |
| 2,650,485 | La Greca | Sept. 1, 1953 |

FOREIGN PATENTS

| | | |
|---|---|---|
| 67,079 | Switzerland | Dec. 11, 1913 |
| 368,873 | France | Oct. 11, 1932 |
| 92,209 | Sweden | May 4, 1938 |